M. E. ZELLER.
TRACE BUCKLE.

No. 258,205.                     Patented May 16, 1882.

WITNESSES
W. H. H. Knight
H. I. Bernhard

INVENTOR
M. E. Zeller
By Edson Bro's
His Attorneys

UNITED STATES PATENT OFFICE.

MELANCTHON E. ZELLER, OF BLUFFTON, OHIO.

TRACE-BUCKLE.

SPECIFICATION forming part of Letters Patent No. 258,205, dated May 16, 1882.

Application filed February 26, 1880.

*To all whom it may concern:*

Be it known that I, MELANCTHON E. ZELLER, of Bluffton, in the county of Allen and State of Ohio, have invented certain new and useful Improvements in Trace-Buckles; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1:
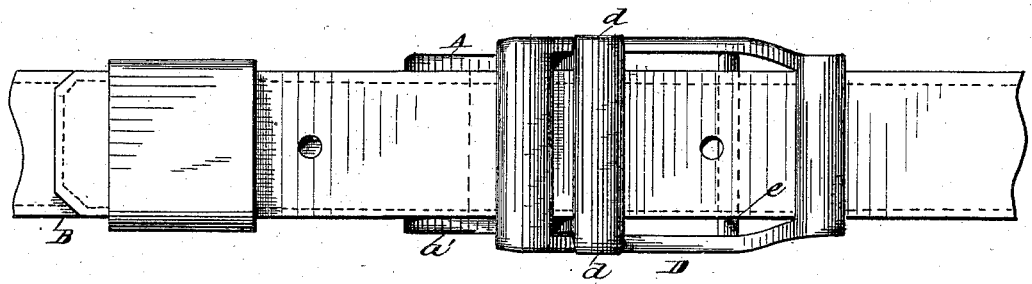
Figure 2:
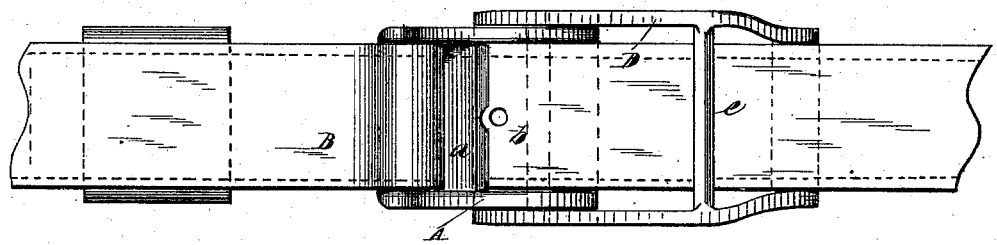
Figure 3:
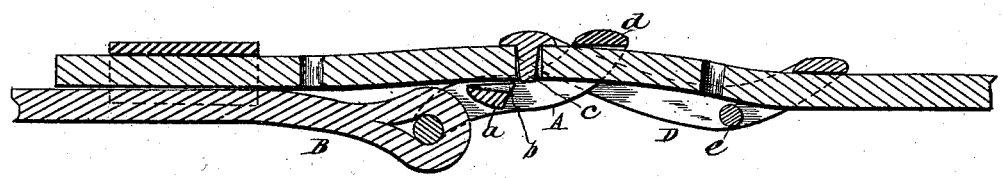
Figure 4:
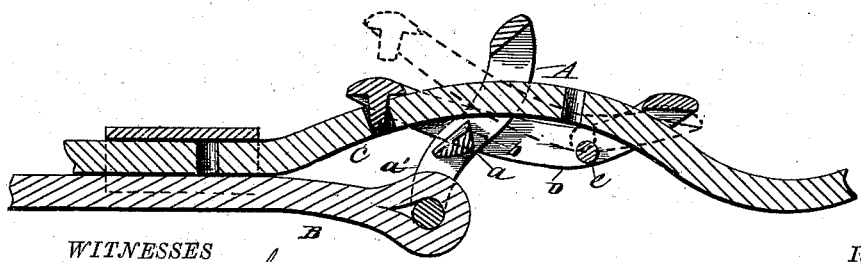

Figure 1 is a plan view of my improved trace-buckle. Fig. 2 is an inverted view thereof. Fig. 3 is a sectional view, showing the parts in a buckled position; and Fig. 4 is a sectional view, showing the trace released.

This invention has relation to an improvement in trace-buckles, having for its object to hold the trace and tug out of frictional contact with each other, to accommodate straps of varying thicknesses, and to permit the unbuckling of the straps readily and easily, however thick; and it consists of a bail having a grooved subdividing cross-bar and curved side bars to enable said bar to support the strap passing through it; in arranging said bar in such manner and so curving the outer portion of the bail as to provide the greatest possible space between it and the outer end of the buckle, substantially as hereinafter more fully set forth and claimed.

In carrying out my invention I employ a bail, A, having a subdividing cross-bar, $a$, and a curvature, $a'$. The latter extends from the inner end of said frame to the bar $a$ in such a manner as to enable the arrangement of the bar with said end of bail in a relative parallel plane so far removed therefrom as to allow the connecting of the tug B to the latter and the passing of the trace through the bail without subjecting the tug and trace to frictional contact or a chafing action one upon the other, they being separated by the bar $a$. This I consider as one of the more important features of my invention.

The next feature is the arrangement of the bar $a$ at the farthest removed point possible from the outer end of the bail A and recurving the outer portion of the bail, causing the general form of the bail to resemble the shape of an inverted S, as shown. Owing to this arrangement and construction, the greatest possible space is obtained for the passage and manipulation of a trace or strap readily and easily, however thick, when performing the buckling and unbuckling operation.

The next feature is providing the subdividing cross-bar $a$ with a transverse recess, $b$, to permit the ready passage of the tongue of the frame as the bail is being drawn up the incline of the frame and the latter up that of the bail, due to its S shape, to effect the buckling of the trace, the tongue having been inserted in an aperture in the trace.

D is the frame, concavo-convex shape, having the tongue $c$ depending from its forward end bar, and arranged outside of or having the bail passing through it, the outer projecting end bar, $d$, of the bail resting upon the frame D, and the forward end or tongue bar of the frame resting on the bail. The frame D has also a subdividing cross-bar, $e$, to support the trace or strap passing through it.

I claim and desire to secure by Letters Patent—

In a trace or harness buckle, the bail having a tug-bar, two side bars of an inverted-S shape, the subdividing cross-bar at a point past the center, and having a transverse recess or groove, and adapted to slide on the frame, in combination with a frame having its inner end provided with a tongue, substantially as and for the purpose set forth.

In testimony that I claim the foregoing I have hereunto set my hand this 17th day of January, 1880.

MELANCTHON E. ZELLER.

Witnesses:
A. C. BARNES,
PH. REEHLING.